Jan. 18, 1955
H. H. LIVINGSTON
2,699,774
BONE PIN LOCKING DEVICE
Filed May 12, 1952
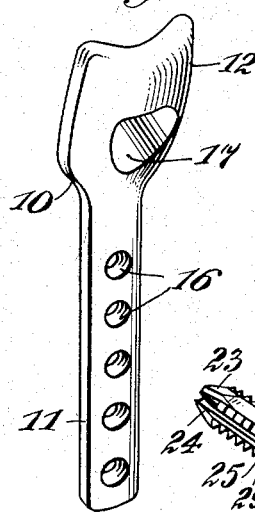
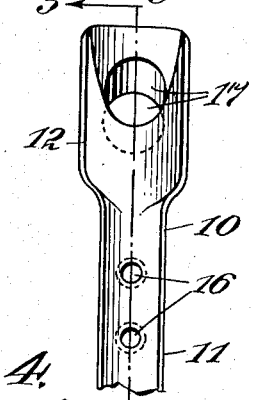
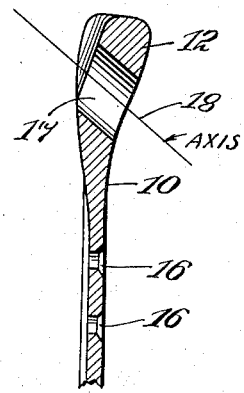
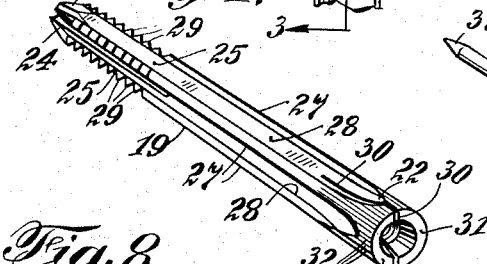
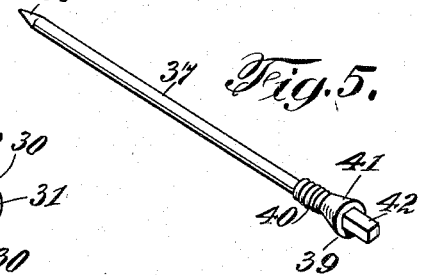
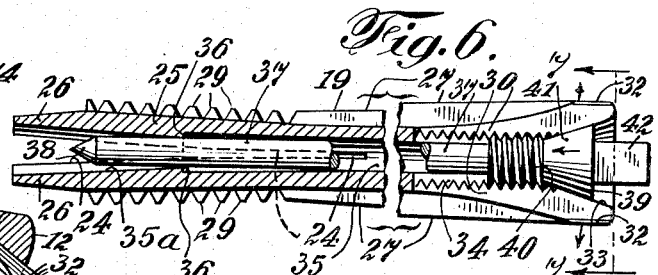
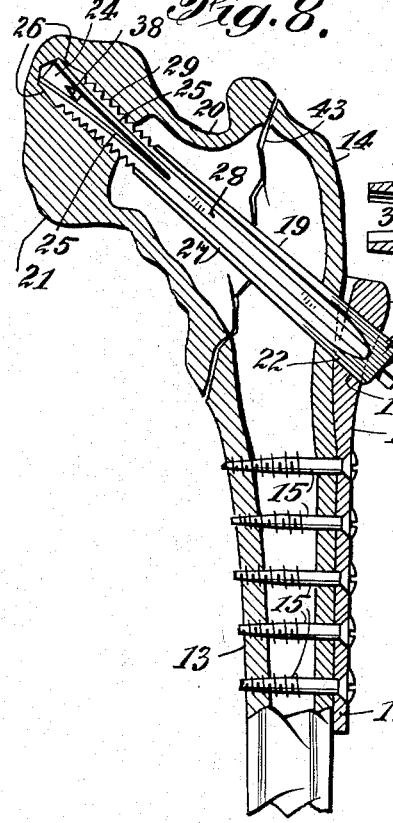
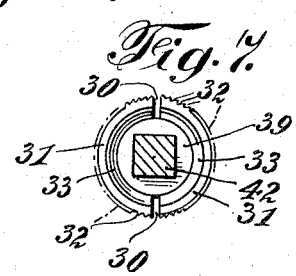
INVENTOR.
Herman Harrison Livingston
BY
C. P. Goepel
his ATTORNEY

United States Patent Office 2,699,774
Patented Jan. 18, 1955

2,699,774
BONE PIN LOCKING DEVICE

Herman Harrison Livingston, New Rochelle, N. Y.

Application May 12, 1952, Serial No. 287,300

2 Claims. (Cl. 128—92)

The present invention relates to improvements in bone pin locking devices, that is, a pin used to hold fragments of broken bones together to enable their knitting and has for an object to provide a device of this kind which is an improvement over the bone pin described in my U. S. Patent No. 2,490,364, granted December 6, 1949.

Another object of the present invention is to provide an improved bone pin locking device which comprises a shell member, a rod and a series of plates adapted to be selectively secured to the shaft of a broken bone and having shell member receiving openings, the longitudinal axis of the opening of each plate being at an angle to the longitudinal axis of its plate and this angle for each plate being different from that of each of the other plates. With this arrangement the angle of the shell member to the shaft of a broken bone may be controlled by the selection of a plate having a shell member receiving opening of the desired angular disposition. This arrangement will also permit the plate being secured to the shaft of the bone first and then the shell member being driven through the opening in the plate and into the bone.

A further object of the present invention is to provide an improved structure in which cooperating means are provided on the shell member and the rod for locking the shell member to the plate and thereby locking the head and the shaft of the broken bone together.

In one of its broadest aspects the present invention contemplates the provision of a bone pin locking device comprising a plate adapted to be secured to the shaft of a broken bone and having an opening therethrough, a shell member adapted to be driven through the opening in the plate and into the fragments of the broken bone, a rod adapted to be inserted into the shell member, and cooperating means on the shell member and the rod for causing the shell member to become locked to the plate.

More specifically, the present invention contemplates the provision of a bone pin locking device comprising a shell member having an entrance end portion provided with expansible sections of the shell member, said shell member having a trailing end portion provided with expansible sections having inner conical surfaces, a plate adapted to be secured to the shaft of the bone and having an opening for receiving therethrough the shell member and for housing the expansible sections of the shell member, said rod having a trailing end portion, a conical member on the trailing end portion of the rod for cooperating with the conical surfaces on the shell member for causing the outer surfaces of the expansible sections on the trailing end portion of the shell member to frictionally grip the wall of the opening in said plate for locking the shell member to the plate, the outer surfaces of the trailing end portion expansible sections being rugose to increase the gripping action with the wall of the plate opening.

With the foregoing and other objects in view, the invention will be hereinafter more fully described and more particularly pointed out in the appended claims.

In the drawings in which the same parts are denoted by the same reference numerals throughout the several views, Figure 1 is a rear perspective view of the plate which comprises one of the parts of the present invention, Figure 2 is a fragmentary rear elevational view of the plate, Figure 3 is a sectional view taken on the line 3—3 of Figure 2, Figure 4 is a perspective view of the shell member, Figure 5 is a perspective view of the rod, Figure 6 is an enlarged sectional view of the shell member and the rod, showing the expansible sections in partially expanded position, Figure 7 is a sectional view taken on the line 7—7 of Figure 6, and Figure 8 is a fragmentary sectional view through the upper end portion of a fractured human femur showing the improved device applied thereto.

Referring more particularly to the drawings, 10 indicates a plate having a shank 11 and a head 12 which are slightly curved transversely so as to provide a forward concave surface conforming to the outer contour of the shaft 13 of a fractured bone 14 which is illustrated in Figure 8 of the drawings as a human femur. The plate 10 may be secured to the shaft 13 by fastening elements 15, such as screws or the like, which extend through countersunk holes 16 formed in the shank 11 of the plate and penetrate the shaft of the bone.

The head 12 of the plate is wider and thicker than the shank 11 and extends upwardly and rearwardly from the shank at an angle thereto, as can be seen more clearly from Figures 2 and 3 of the drawings. The head 12 has a through opening or passageway 17 the longitudinal axis 18 of which extends at an angle to the longitudinal axis of the main portion or shank of the plate. A series of plates may be provided the longitudinal axis of the opening of each plate being at an angle to the longitudinal axis of its plate which is different from that of each of the other plates.

A shell member 19 is adapted to be driven through the opening 17 of the plate, the upper part of the shaft of the bone and through the neck 20 and into the head 21 of the bone. The shell member 19 tapers from its larger cross-sectional base or trailing end portion 22 towards its smaller cross-sectional entrance portion 23. The member 19 is split along part of its length at its entrance portion by lateral slits 24, one at each side, to form two expansible sections or portions 25. The tip is pointed as shown by inclined surfaces 26. The member 19 has four ridges 27 with a valley 28 between each pair of adjacent ridges and each ridge and valley taper from the tip 26 to the base 22, with the lowest depth at the tip and the largest depth at the base to create a gradual wedging effect on the movement of the members 19 into the bone when driven into the bone. The base portions of the ridges and the valleys merge into the circumferential trailing end portion 22. Inwardly of the tip 26, the expansible sections 25 have large low pitch screw threads 29 formed on the ridges 27.

The trailing end portion of the shell member is split along its length by two substantially diametrically opposite slits 30 to form two substantially semi-circular expansible sections 31. The slits 30 are circumferentially spaced from the slits 24 an angle of the order of ninety degrees. The outer surfaces of the sections 31 may be roughened by the formation of longitudinally extending serrations 32. The outermost portions of the inner surfaces of the sections 31 are of conical shape as at 33 with the base of the cone at the outermost end of the sections 31. Inwardly of their conical surfaces 33 the inner surfaces of the sections 31 are provided with screw threads 34.

The shell member 19 has a bore 35 extending from the trailing end 22 to the tip 26; the portion 35a of the bore 35 being of reduced diameter to form internal shoulders 36. A cylindrical rod 37 is adapted to be inserted into the bore 35 of the shell member and has an external diameter substantially equal to the internal diameter of the bore 35 so that the member 19 and the rod 37 form substantially one structural unit as to strength when driven into the bone. The rod 37 has at its entrance end a wedge or conical shaped tip 38 and on its trailing end portion a collar 39, which may be formed integral with the rod and which has a screw threaded portion 40 and a conical shaped portion 41. Outwardly of the portion 41, the rod 37 has a non-circular end 42 for reception by a similarly shaped socket of a tool for rotating the rod.

In the use of the device, the surgeon will select a plate 10 having its opening 17 arranged at the angle at which it is desired to drive the bone pin into the fragments of the fractured bone. This angle may be previously determined by the surgeon by the conventional examination of the patient. The selected plate 10 will then be secured to the shaft 13 of the bone as shown in Figure 8 of the drawings. The shell member will be driven through the opening 17 of the plate through the shaft 13 of the bone and into the head 21. The rod 37 will then be inserted into the shell member with the tip 38 foremost. The length of the rod 37 is such that when the tip 38 engages the shoulders 36, the other end of the rod, that is, its screw threaded portion 40 extends outwardly of the member 10, a distance corresponding to the distance of the movement of the rod to its operative extent.

When the rod 37 is rotated clockwise it is moved inwardly of the member 10 and the wedge tip 38 of the rod acts against the shoulders 36 and expands the expansible portions 25 to the position shown in Figures 6 and 8 of the drawings. The outer parts of these portions 25 form a wedge acting anchorage and move one fragment of the fractured bone against the other fragment along the line of fracture 43 so as to be in close contact to facilitate knitting. At the same time, the conical portion 41 of the rod will engage the inner conical surfaces of the expansible sections 31 to force the outer rugose surfaces of the sections 31 into tight frictional engagement with the wall of the opening 17 of the plate to lock the plate and member 10 together and to lock the head 21 and the shaft 13 of the bone together.

It will be noted that the slits 24 and 30 are angularly offset about ninety degrees and that the sections 25 and 31 are similarly offset so that any torsional strains which are imposed on the shell member due to the contact of the sections 25 with the head 21 and of the sections 31 with the plate 10 will be distributed by different paths along the shell member and will tend to counteract one another.

If it is desired to withdraw the shell member, the rod will be rotated counterclockwise so that the expansible portions 25 and the expansible sections 31 will collapse and the shell member may then be withdrawn.

It is obvious that various changes and modifications may be made in the details of construction and design of the above specifically described embodiment of this invention without departing from the spirit thereof, such changes and modifications being restricted only by the scope of the following claims.

What I claim is:
1. In a bone pin locking device having a shell member with an entrance end portion and a trailing end portion, said entrance end portion being provided with expansible sections for gripping the interior of one fragment of a broken bone when said shell member is driven into the bone fragments, and a rod in said shell member, said rod having an entrance end portion and a trailing end portion, the combination of cooperating means at the entrance end portions of said shell member and said rod for expanding said expansible sections of said shell member at the entrance end thereof, said trailing end portion of said shell member being provided with expansible sections having inner conical surfaces, a plate like member suitably shaped to conform to the contour of the shaft of the broken bone and adapted to be rigidly secured to said shaft, said plate like member having an opening for the passage of said shell member therethrough, said opening housing said expansible sections of said trailing end of said shell member when said shell member is driven into the broken bone therethrough, said rod having a conical member on said trailing end portion thereof, said conical member cooperating with said conical surfaces in said shell member to cause the outer surfaces of said expansible sections on said trailing end portion of said shell member to frictionally engage the wall of said opening in said plate like member and to lock said trailing end portion of said shell member to said plate like member when said rod is advanced into said shell member.

2. A bone pin locking device as claimed in claim 1, wherein said shell member is provided with internal screw threads adjacent said trailing end portion thereof, and said rod is provided with external screw threads engaging said internal screw threads in said shell member to cause movement of said rod into said shell member when said rod is rotated in one direction, and to cause withdrawal of said rod from said shell member when said rod is rotated in the opposite direction.

References Cited in the file of this patent
UNITED STATES PATENTS

| Number | Name | Date |
|---|---|---|
| 2,397,545 | Hardinge | Apr. 2, 1946 |
| 2,490,364 | Livingston | Dec. 6, 1949 |
| 2,557,669 | Lloyd | June 19, 1951 |
| 2,612,159 | Collison | Sept. 30, 1952 |